Dec. 3, 1963 T. B. WAYNE 3,113,032
PROCESS OF PREPARING A RICE PRODUCT
Filed Feb. 18, 1960 3 Sheets-Sheet 1

FIG. 1a

INVENTOR
TRUMAN B. WAYNE
BY
ATTORNEY

Dec. 3, 1963  T. B. WAYNE  3,113,032
PROCESS OF PREPARING A RICE PRODUCT
Filed Feb. 18, 1960  3 Sheets-Sheet 3

INVENTOR
TRUMAN B. WAYNE
BY
ATTORNEY

United States Patent Office 3,113,032
Patented Dec. 3, 1963

3,113,032
PROCESS OF PREPARING A RICE PRODUCT
Truman B. Wayne, P.O. Box 13086, Houston, Tex.
Filed Feb. 18, 1960, Ser. No. 9,575
6 Claims. (Cl. 99—199)

This invention relates to a process of preparing a rice product in the form of shelled or hulled rice, viz., brown rice.

Rice in the form of shelled rice grains or kernels by removal of the hulls or husks therefrom is particularly difficult to prepare satisfactorily either in the home or the restaurant kitchen. It tends to become sticky and gummy with other than skilled and experienced preparation. Moreover, different varieties of rice require quite different handling, and the average purchaser knows little about different rice varieties and their methods of preparation.

An object of this invention is to prepare a dehydrated, viz., precooked, porous rice product which may be regenerated into a highly satisfactory, uniform product in the average kitchen by a simple, standardized cooking procedure which will yield a fluffy, tender rice preparation, in which the grains stand apart instead of being cooked into a sticky, gummy product which consists largely of conglomerates and broken grains.

In accordance with illustrative embodiments of this invention, the rice is gelatinized by precooking it to a substantial degree, although not necessarily completely, and the gelatinized rice is subjected to a process which renders it very porous, after which it is dried. This property of high porosity allows it to quickly reabsorb water and regenerate a soft cooked rice, which is substantially the same as if the rice were prepared from the whole raw rice grain by cooking in accordance with the usual home or restaurant kitchen practices, or as done in industrial plants which utilize prepared, whole grain cereal foods, for instance containing rice, barley or corn. This regeneration of the processed rice product requires only a fraction of the time required for the usual method of preparation, and, therefore, results in a substantial time savings and convenience to the housewife or others who prepare cooked rice, or food preparations containing cooked rice, on a commercial or industrial scale. Moreover, its quality and cooking requirements have been largely determined and fixed in the manufacturing operation.

A novel feature of the process embodying this invention, is the use of a quick freezing process, wherein the cooked rice is subjected to a temperature sufficiently low, viz., within the range of +20° F. and −30° F., or lower, and the ice which is formed as minute crystals throughout the frozen rice is removed as ice vapor under conditions which are carefully controlled to prevent a substantial reabsorption of liquid phase moisture within the voids formed by the freezing step so as to preserve the porous structure of the rice grains when the frozen rice is subjected to a drying operation to enhance the voids or pores. This invention is based on the discovery that unless the moisture removal is so controlled, the large amount of liquid phase liberated during thawing will be readily reabsorbed or soaked up by the porous, strongly lyophilic starch content of the cooked rice, and any attempt to dehydrate the product will result in destruction of a large proportion of the fine pores produced by the ice crystals. Even drying of the rice by spreading in thin layers in ambient air results in the production of substantial proportions of horny, vitreous and shriveled grains and grain conglomerates, which not only do not easily regenerate to a satisfactory product after short cooking periods, but are unsightly and break up into an excessive proportion of fines when handled in the drying, screening and packaging operation. Moreover, ambient air and sun drying are too slow for practicable factory production of the product in quantity, and any effort to speed the drying operation in tunnel or rotary dryers in heated air simply aggravates the above described difficulties.

Applicant has discovered that the high degree of porosity which is produced by quick freezing followed by laboratory freeze drying procedures, can be substantially preserved when processing under large scale production conditions by first removing a substantial part of this released moisture under controlled conditions by sublimation whereby substantial wetting and reabsorption of moisture, with consequent destruction of pore space are prevented. Then following the removal of this released moisture, it is possible to complete the dehydration by conventional drying processes. Since the rice grains so treated by sublimation is obviously not 100 percent pore space, there yet remains a substantial quantity of bound water in the shrunken gels still present in the particle which may then be removed by drying procedures which enhance the voids or pores in the rice grains, and which do not destroy the pores which have been formed by ice crystals and gel shrinkage, and which have been left substantially intact by removal of the liquid phase equivalent of these ice crystals under controlled conditions which prevent wetting of the pore walls with consequent reabsorption and swelling which closes these voids. Stated otherwise, since the quick freezing step followed by sublimation was used to liberate water from the gel structures within the cooked rice, if the resulting pores or voids are desired in the finished product they must be protected from contact with free water under conditions which will substantially regenerate the original gels and thereby the original cooked rice.

The objectives of the low temperature freezing process are two fold; first, there is a coagulation and shrinking of the starch gel, and also of the glutelins, a group of simple vegetable proteins such as glutenin and oryzenin, which have also become hydrated to a considerable degree under the process conditions. The freezing process tends to toughen the gel structures to a considerable extent and this reduces the extreme stickiness of some of the starch-glutelin gel mixtures or complexes resulting from the precooking process. This releases free water into the voids caused by coagulation and shrinkage, and the liberated water migrates to increase the size of any ice crystal nuclei which are present. Second, the freezing process followed by sublimation in thus liberating water from these gels and partially denaturing the protein content of the latter sufficiently reduces the tendency of the individual grains to stick together, and renders them free flowing, their tendency to mash under the slightest pressure and smear into sticky films, which defeat materials handling procedures and foul vessels, conveyors, etc.

It is possible to completely remove the ice crystals by sublimation under laboratory or the so-called "commercial" freeze-drying procedures. Under such conditions all of the liberated water in the form of ice crystals would be removed in the vapor state without passing through the liquid phase. Such processes are of very limited production capacity, are extemely slow and require large expenditures per unit of production for expensive, low capacity equipment. Consequently, aside from strictly laboratory uses of freeze-drying, the process is limited to small productions of valuable products, largely biologicals, antibiotics and other expensive, extremely heat-sensitive products.

The process embodying this invention is based on the careful application of freeze-drying at its extreme upper temperature range where its production capacity reaches a maximum, followed by high vacuum, low temperature drying within a temperature range slightly above that of true freeze-drying until substantially all remaining free moisture which has been liberated in the quick freezing step has been evaporated under conditions which prevent extensive absorption and rehydration. This is accomplished by controlling the rate of moisture release from frozen rice by sublimation as ice vapor by maintaining the temperature of the product at or near 32° F. until substantially all moisture originally present as ice crystals has been removed. Following this phase, the drying of the porous product may then proceed according to conventional drying procedures, or the porosity of the product may even by augmented by removing the remaining bound water in the remaining gel structure under expanding or explosive conditions such as are described in the co-pending application Serial No. 9,578 filed February 18, 1960 for a process of producing an expanded, dehydrated rice product.

In general, after the cooked rice has been quick frozen by subcooling well below the freezing point of its gel bound water, which is in the range 26° F. to 28° F. it is subjected to an initial freeze-drying step by sublimation and specifically under a high vacuum preferably within the range of 4.5 mm. down to 0.05 mm. absolute pressure while gently heating the frozen mass by means of a series of closely spaced warming plates, in which warm, compressed refrigerant gas or liquid, low pressure steam or warm water is circulated under thermostatic control from a temperature sensing element inserted in the slowly warming and incipiently thawing mass. For the ultimate in heat economy and ease of control, it is preferred to use compressed refrigerant in a heat pump cycle to effect the necessary warming for rapid dehydration of the product until its moisture content calculated on the wet basis is preferably below 30 percent, after which its moisture content may be further reduced to from 5 to 15 percent by warm air drying at atmospheric pressures.

Once the moisture content of the rice product has been substantially reduced by sublimation and specifically under the high vacuum conditions initially imposed when a high proportion of potential liquid phase moisture exists as ice crystals, higher absolute presures may be tolerated. This is true because no substantial amount of free moisture yet exists to destroy porosity at the higher temperatures corresponding to the higher absolute pressures. Thus, while at 4.579 mm. absolute, the corresponding temperature is 32° F., at 74 mm. absolute, or a vacuum of 27" Hg, the corresponding temperature is 114° F. While the former absolute pressure, or even lower, is desirable in the first stages of dehydration when the liquid phase water potential is high; the latter is entirely satisfactory and even preferable because of faster evaporation rates, lower steam and water consumption by vacuum apparatus, and even much lower capital costs of the vacuum apparatus required once this moisture potential has been sufficiently reduced to not promote extensive absorption and rehydration at the higher temperature.

Another feature of applicant's process is the control of the cooking time for the dehydrated rice product produced by applicant's process by the conditions imposed during the drying process following freezing and partial removal of the moisture by sublimation and/or dehydration at low temperatures. Since the rehydration properties of the product are a function of its porosity following the precooking, quick freezing and low temperature drying operations, applicant has found it possible to control the cooking time of the dehydrated product by the temperature and duration of heating of the product in the final drying step. Temperature and time of exposure to heat determine the degree to which the pores and capillaries formed in the freeze-drying process are closed by shrinkage. By thus controlling the degree to which they are reduced, the time of the regenerative cooking process may be controlled.

For several reasons, it is desirable to use a quick freezing process to freeze the interstitial water between the rice grains and the gel-bound water of the gel structures within the gelatinized rice product as ice. First, it produces many small crystal nuclei throughout the shrunken gel structure which are fed by the migrating water released by syneresis. This causes a uniform and extensive porosity throughout the product. Second, the finished product is firmer as a result of the many but uniform pores and capillaries within it instead of fragile due to the presence of fewer large pores. Third, during the sublimation and low temperature drying stages, less of the porosity is lost due to collapse of the wall structure and the release of large droplets of water which tend to wet and soak the area where the water had been confined. Fourth, and of prime importance, much higher production rates are possible than from a slow freezing process in which an attempt is made to obtain porosity by slowly building crystals at or slightly under the freezing temperature. The latter process produces fewer but larger pores after the ice is removed in the subsequent sublimation and/or low temperature drying step, and is very time consuming. Production rates are very much slower in equivalent apparatus than when the quick freezing process which develops lower temperatures in much less time, is used.

Regardless, however, of the method and rate of freezing in producing gel coagulation and ice crystals within the gel voids, an important feature of applicant's process is the avoidance of quick thawing under atmospheric or higher pressures and temperatures with the immediate release of free water which must be evaporated at temperatures between 80° F. and 180° F. Instead, following freezing, a low temperature dehydration process is instituted which allows removal of substantial proportions of the water content before the temperature of the mass exceeds 32° F.; and provides for continuance of the dehydration process to remove the major part of the water as ice vapor before warm air drying is used to produce the final dehydration. The latter is used to control the rehydration rate when the product is subjected to cooking by the housewife, commercial cook or industrial user; since the higher the temperature and/or the longer the exposure to warm air drying, the more pore shrinkage and closure occurs.

A further embodiment of applicant's process provides for the rapid removal of residual moisture in hot air currents under conditions which produce further expansion and porosity in the product. After drying the product to a moisture content between 10 and 20 percent, it is exposed to a stream of hot air having temperatures ranging between 300° F. and 600° F. This produces an almost instantaneous flashing and expansion of the moisture within the product, some of which escapes as superheated water vapor and leaves further voids or pores within the product. Its moisture content has been reduced to within the range of 4 to 10 percent by this flash drying step which is advantageously carried out in the fluidized state with a mixture of combustion gas products and superheated stream having a low free oxygen content. This treatment under controlled atmospheres is of advantage where a light colored product is desired, but if a toasted or browned product is desired, the flash drying and expansion process may be accomplished in a stream of hot air or combustion products where the oxygen content is not subjected to close control.

The process may be operated as batch, semi-continuous, or continuous operations. For example, the rice may be steeped, cooked, washed free of starchy cooking waters and drained by either a series of operations in the same vessel, or in a series of vessels in a continuous sequence of steps or operations. Likewise, the freezing, sublimation and drying steps may be conducted in a batch freezer or in a continuous belt freezer where the product is frozen and subsequently partially dehydrated under sublimation conditions by cold air blasts of low absolute humidity; or it may be frozen between parallel metal belts which are sprayed with refrigerated brine in a manner resembling the freezing of fish fillets, followed by partial sublimation with cold air of low absolute humidity, or by means of a vacuum sublimation procedure. If, as in an illustrative embodiment, the frozen product is partially dried by sublimation of a proportion of the ice crystals and the fast removal of any liquid phase under high vacuum, this step may be more conveniently carried out in the freezing vessel by connecting it to a vacuum apparatus. Following a substantial removal of the product's moisture, the free flowing product may then be removed from the batch freezer and the remaining drying operations accomplished in any form of conventional dryer, viz., in a tunnel dryer or fluidized system to avoid too much particle breakage and dust formation.

It has been proposed that rice be cooked and subjected to quick freezing to prepare a frozen, precooked rice product to be dispensed from frozen food cabinets in grocery stores and supermarkets. Such rice is not subjected to a dehydration process before packaging and sale, but is simply readied for the table by warming or even by thawing it in hot water, draining off the excess water and then warming for a few minutes to render it more dry and fluffy. Such products do not have wide appeal, however, because the frozen product represents relatively little food value at a high price per unit of dry substance. Moreover, unless preservatives are added, it does not keep very long and becomes infested with blue mold and other hardy fungi which originate in the raw rice and survive both the cooking and freezing processes.

Also, precooked, dehydrated rice has been prepared and marketed which differs widely both as to the product and process of manufacture from the product and processes of applicant's invention. In the preparation of these other products, the rice is precooked and then dried in heated air or at elevated temperatures in a vacuum dryer. The gelatinized, cooked rice shrinks to a vitreous, chalky product, in which the rice grains are severely "checked," i.e., there are many lines of fracture running across the grain which result from the drying operation. Advantage is taken of this "checked" condition of the individual grains to provide points of entry for water into their vitreous structure during the recooking operation in the housewife's kitchen. This product is also characterized by the formation of extensive conglomerates of individual grains and broken grain fragments when drying the sticky, gelatinized, cooked rice which, when an attempt is made to separate them into individual grains, results in the excessive production of broken grain particles and dust. The product of such process is very sensitive to overcooking and even to standing in the cooking vessel after it is removed from the heat source, and produces a mixture of soft, mushy, gel resulting from the fines and dust in a mixture with undercooked, chalky particles resulting from the larger vitreous particles which resist hydration in the regenerative cooking operation. Actually, this is the type of product which would be produced even if the cooked, frozen rice should be subjected to similar conditions during dehydration, and it is this which applicant's process is specifically designed to avoid.

An illustrative procedure is to remove enough of the free water by sublimation under dynamic conditions directly from the ice phase within a temperature including the temperature of the frozen gelatinous rice up to 32° F. or lower under very high vacua to minimize the effects of reabsorption of liquid phase moisture by the coagulated gels. An alternate but slower procedure is to evaporate the water at temperatures between the freezing point of the gel and somewhat above the freezing point of water with cold, dehumidified air or under conditions where very little, if any, free water appears in the liquid state to deleteriously affect the porous structure in the product. Both procedures may be used in sequence, i.e., a considerable proportion of the water may first be removed by sublimation under high vacua, and after the product is sufficiently dry and free flowing, the drying may be continued in cold air under less than saturated humidity conditions, or by means of a vacuum drying procedure. Finally, after the free water is substantially or entirely removed, and the remaining water is that bound in the gels, resort may be had to forced drying with warm air to complete the dehydration process and control the nature of the porous structure and thereby the rehydration properties of the finished product. This may be accomplished by heating ambient air or the use of clean combustion products. For best results, it is desirable to use warm air which has previously been dehydrated by passing it through a bed of silica gel or other dry desiccant, or else through a solution of a salt such as lithium chloride or calcium chloride. Dry air of this character prevents an undue temperature rise in the product because of its evaporative cooling effect.

An important result from the practical standpoint of applicant's procedure of processing the gelatinized, viz., precooked rice is that it provides a means of handling it in process without the troublesome complications which occur when the sticky, gelatinous product must be directly handled and conveyed to and through drying apparatus. Thus, applicant avoids the conglomerates, the fines and the fouling of heating surfaces and vessel walls with dried, horny films which result from smearing them with the wet gels. These advantages, alone, provide the difference between processes characterized by operating difficulties, high production costs, reduced yields, a disproportionate content of fines and nonuniform rehydration when recooked; and a satisfactory process which produces high yields of whole rice particles and a porous, dehydrated product which rehydrates uniformly when handled in the kitchens in homes, commercial establishments and food plants to yield a reconstituted cooked rice of uniform grain size, texture and excellent flavor.

The present invention contemplates the use of a non-toxic refrigerant in direct contact with the previously gelatinized rice which has been prepared by any suitable method. The refrigerant may be any suitable liquefied gas such as liquid argon, nitrogen or carbon dioxide. It is possible to use liquefied petroleum hydrocarbons such as propane to effect the freezing operation, but a stripping operation under relatively high vacuum is required to free the food product of residual traces of the gas which impart a slight hydrocarbon flavor.

Liquid carbon dioxide and liquid nitrogen are the suitable refrigerants. Both are non-toxic, relatively tasteless, low in cost, may be originally produced at low cost, especially when recovered as by-products from other operations, may be substantially all recovered from process in relatively simply recompression and purification cycles, and carbon dioxide has the added property of being soluble in water and thus contributes to the porosity-producing process when it goes into solution into the water content of the cooked rice under the pressure and temperature conditions existing in the freezing apparatus. Then, as the temperature of the frozen mass is raised during the sublimation and vacuum evaporation steps which follow the freezing operation, the dissolved carbon dioxide readily boils out of its dissolved state and aids in the sublimation and/or evaporation of moisture present as carbonated ice crystals.

In applicant's process, the liquid refrigerant is expanded into the vessel into direct contact with the gelatinized rice. With carbon dioxide, it may be expanded directly into a gas, or expansion conditions may be such that a proportion of carbon dioxide snow is also formed. With liquid nitrogen, no solid phase is produced, the liquid expanding directly to a gas. It is advantageous to introduce sufficient of the liquid refrigerant into the vessel through a suitable orifice to produce rapid expansion and freezing effects. The gas leaving the freezing area is at a sufficient pressure to enter a succession of freezers to exert a pre-cooling effect prior to the successive introduction of liquid refrigerant to the remaining freezers. The spent refrigerant gas is then returned to a recompression cycle, dehydrated and returned to the refrigeration cycle.

The advantages of employing a non-toxic refrigerant, such as carbon dioxide, is that it does not impart a foreign taste to the final rice product, is non-toxic, that it is not flammable and is cheap. The refregirenat is substantially removed during the sublimation operation.

The following example is representative of a specific embodiment of applicant's process, and also explains all process steps, inclusive of spent refrigerant gas recovery, in detail. It will be understood, however, that other procedures and combinations of batch, semi-continuous and continuous operations within the scope of the appended claims, may be used without departing from the spirit of this invention. Obviously, however, in a process where refrigerant is maintained in direct contact with the product and must be recovered therefrom, continuous freezing and refrigerant recovery operations may not be as suitable as batch sequences operations so arranged as to provide equivalent flow, because of the difficulty in preventing losses of refrigerant and infiltration of air which will introduce difficulties in the recompression and purification cycles which precede return of the refrigerant to the refrigeration cycle.

*Example 1*

Reference is made to FIGS. 1a, 1b, 2 and 3, which illustrate the process and recycle gas recovery system. In brief, the gelatinized rice is frozen in direct contact with refrigerant gas, or solid refrigerant snow and gas; is then dehydrated by sublimation and low temperature evaporation procedures until the remaining moisture content of the product is approximately 25 to 30 percent where the danger of substantial porosity destruction is passed, after which the residual moisture is reduced to within the range of 4 to 14 percent if no further processing is contemplated. If, however, the partially dried product is to be subjected to the expansion drying process disclosed in applicant's co-pending application, Serial No. 9,574 filed February 18, 1960 its moisture content should be within the range of 10 to 20 percent for best results. In the latter case, the final moisture content of the finished product will range between 4 and 10 percent.

Figure 1A:
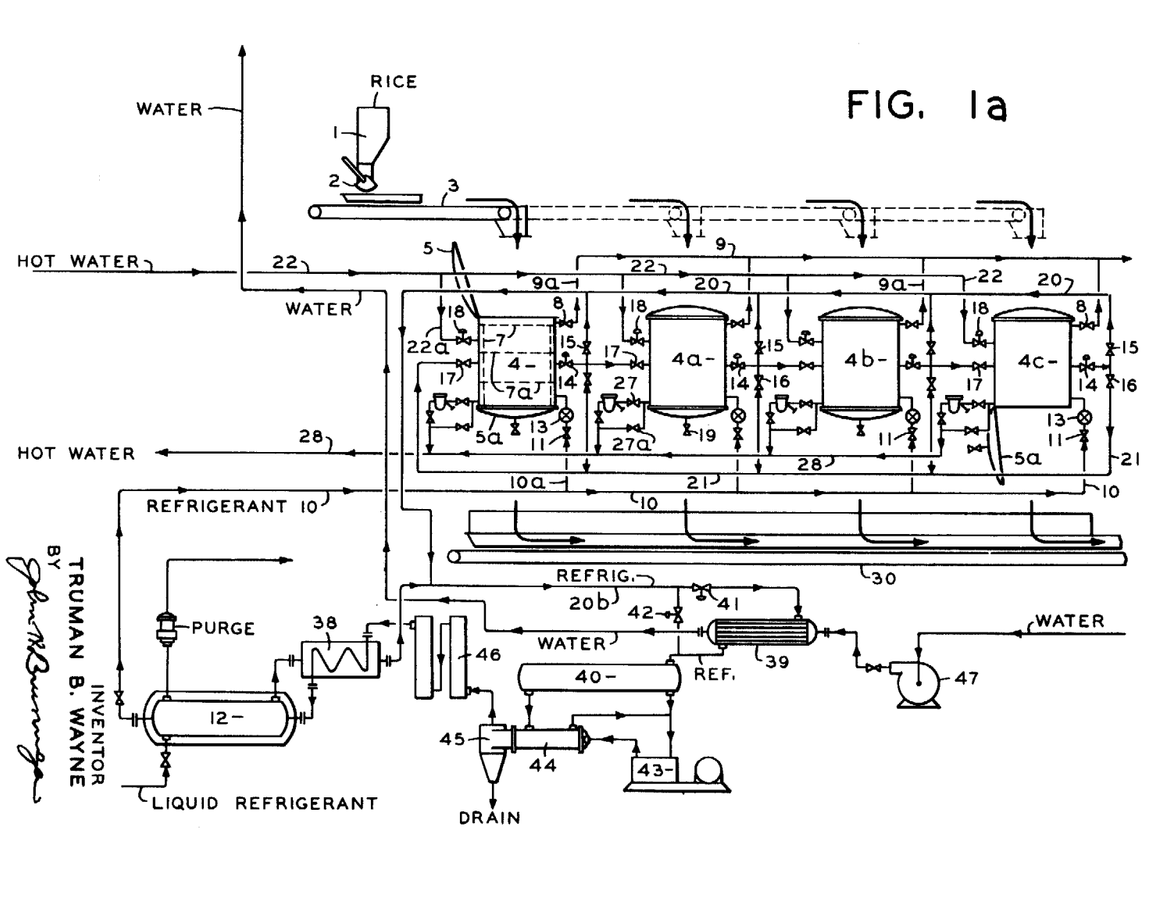
FIGS. 1a and 1b represent a diagram of the flow sheet.
Figure 1B:
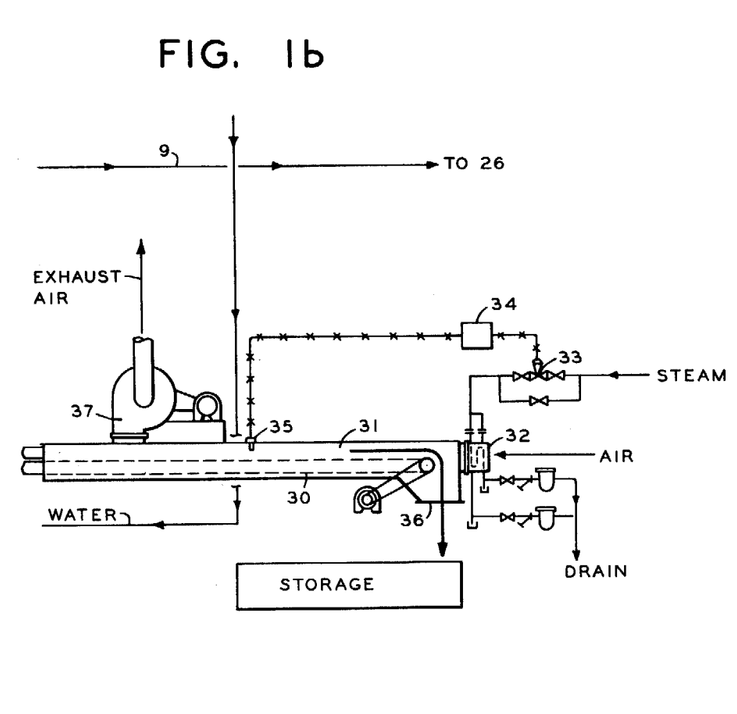

Rice which has been cooked to the desired extent, separated from its cooking waters, freed of adhering starchy and glutinous matter by thorough washing, and drained of free surface moisture by any suitable method, but preferably prepared in accordance with the process disclosed in applicant's co-pending application, Serial No. 9,577 filed February 18, 1960 is drawn from hopper 1 by means of gate 2 and discharged on belt conveyor 3 for delivery to one of the freezer-sublimator vessels 4, 4a, 4b, or 4c, whichever is ready in their cycle sequence to receive a charge of prepared rice. These vessels are all identically equipped with a hinged upper head 5, which is opened and thrown back in order that the charge of rice may fall into the freezing, sublimation and drying spaces between the heating plates 6, which are arranged in a spaced, vertical pattern within the inner, perforated basket 7, which is contained within the vessel 4 et seq.

Heating plates 6 are preferably of the plate coil type to receive low pressure steam or warm water or other fluids. However, they may be electrically heated under careful temperature control by an induction or similar method. Their purpose is to supply heat at a carefully controlled rate to effect warming of the rice after it is frozen to the point where sublimation of refrigerant snow and ice crystals within a temperature range including the temperature of the frozen gelatinized rice and up to 32° F. is initiated. Following some initial sublimation, the remaining moisture may be removed by progressively increasing the temperature to promote evaporation under safe conditions, as hereinbefore explained.

Figure 2:
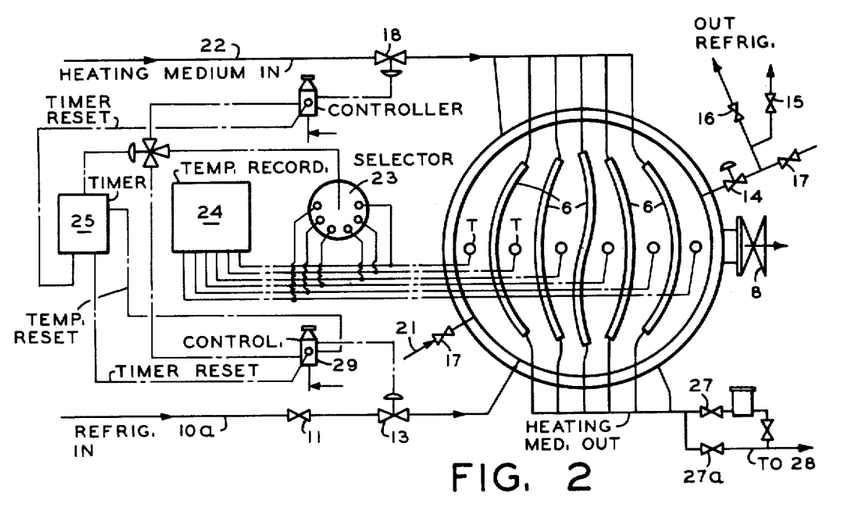
FIG. 2 is a detail plan partly in section of the freezer-sublimator.
Figure 3:
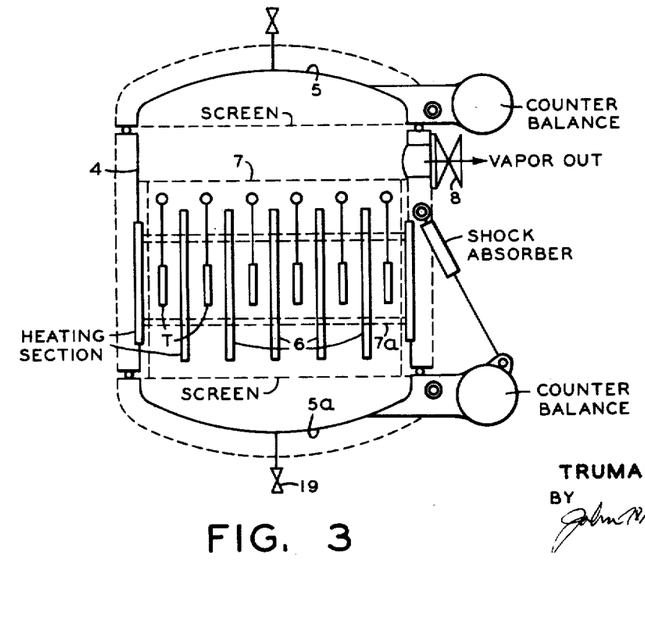
FIG. 3 is a detail elevation partly in section of the freezer-sublimator.

Perforated basket 7 may be fabricated of 8-mesh screen, preferably of stainless wire construction, or of a perforated metal having a similar percentage of open area. The perforated metal is preferred as it does not foul as easily, and is easier to clean because of its smooth surfaces. The basket is fitted with several concentric outer rings 7a, which surround the cylindrical screen and fit snugly inside the outer shell of the vessel, thus acting also as baffles within the annular space between the cylindrical inner basket and the outer shell. This construction aids in channeling the refrigerant gas through all areas of the rice charge instead of allowing it to short circuit to the vessel outlet. This basket has no top cover nor bottom, but both top head 5 and bottom head 5a are equipped with circular screen inserts which are of slightly larger diameter than that of the basket, itself. The bottom screen thus provides a perforated bottom for the basket when bottom head 5a is raised to the closed position. When bottom head 5a is lowered, the bottom of the cylindrical basket is thus removed and the rice charge may be dropped from the vessel. The screen in the upper head 5 does not fit directly on the upper rim of the inner basket 7, but the extension of vapor exhaust pipe 9a is arranged to receive its vapor above the screen in upper head 5 to prevent entrainment of product into the vapor line 9a. However, other preventative constructions are contemplated as equivalent arrangements.

With block valves 8, 15, 16, 17, 18 and combination drain-vacuum breaker valve 19 all closed, and pressure control valve 14 set to relieve refrigerant gas from freezer-sublimator 4 at any convenient pressure of 2 p.s.i.g. or higher, but always sufficient to force the partially spent refrigerant gas through at least one succeeding freezer-sublimator in the series, liquid refrigerant block valve 11 on refrigerant branch line 10a, which draws liquid refrigerant from liquid refrigerant holder 12 through refrigerant header 10, is opened and liquid refrigerant is admitted through expansion valve 13. With liquefied gases such as carbon dioxide which form a solid phase upon expansion, valve 13 is preferably a calibrated orifice equipped with a thermostatically-controlled warming device or jacket to prevent plugging. With other liquefied gases, a conventional automatic expansion valve is suitable. The admittance of expanded refrigerant through expansion valve 13, which may be either of the thermostatic or pressure control type, quickly cools and freezes the gelatinized rice charge in the vessel as it passes through the product and leaves through pressure control valve 14 from whence it passes through open block valve 17 and enters the adjoining freezer-sublimator in series which may utilize the partially spent refrigerant gas for either precooling or initiating a temperature rise, this depending on whether its rice charge is ready to receive refrigerant to begin its freeze cycle, or has been frozen and is ready to begin its sublimation cycle. However, if this adjacent vessel is receiving fresh refrigerant or is being subjected to sublimation, or dumping, the partially spent refrigerant gas relieved through valve 14 may either be sent to spent gas header 20 by closing valve 17 to the adjoining vessel and opening valve 15; or it may be sent to the by-pass gas header 21 by opening valve 16. This arrangement allows the by-passing of the next vessel in series by refrigerant gas leaving a freezer-sublimator, which is receiving a primary charge of expanded, liquid refrigerant, and delivers such gas either to the refrigerant recovery system to be later described or to another freezer-sublimator, on which the valving arrangement above described has been arranged to admit gas through its valve 17.

Reference is made to the instrumentation in the control scheme shown in FIGURE 2. Each freezer-sublimator is equipped with a number of temperature sensing elements T, which are connected through a selector switch 23 to a temperature recorder-controller 24. The latter in conjunction with a cycle timer 25 controls the solenoid- or air motor-equipped liquid refrigerant block valve 11 on pipe 10a, and likewise through a valve selection control system it is adapted to open one of the similarly equipped valves 15, 16 or 17, which is adapted to receive partially spent refrigerant gas, as previously explained, from the piping connecting pressure control valve 14 of the preceding freezer-sublimator while closing the others to direct the gas either into the spent refrigerant gas header 20 by opening valve 15 and closing valves 16 and 17; into by-pass refrigerant gas header 21 by opening valve 16 and closing valves 15 and 17; or into the adjoining freezer-sublimator by opening valve 17 and closing valves 15 and 16. This control, which either fully opens or closes this group of block valves without modulation, is effected from the operator's control station following filling of the vessel with the rice charge, closing and securing head 5 and closing valve 19.

When the freezing cycle is thus started, liquid refrigerant is expanded into the freezer-sublimator and exits in the selected manner as above described. The rice charge is frozen, and when its temperature reaches the desired point, the interposed cycle timer 25 takes over and maintains the refrigerant flow through valves 11 and 13, and out of the vessel through the selected spent refrigerant route, as above described. After the selected freezing time for which the cycle timer 25 is set has passed, the latter energizes an electrical or compressed air circuit which closes valve 11 to shut off the refrigerant flow, simultaneously closes valve 14 and whichever valve of the 15, 16 and 17 series that was open during the refrigerant flow. Valve 8 is opened to vacuum line 9, which leads to the multi-stage vacuum pump 26, and valves 18 and either 27 or 27a are opened to admit low pressure steam or hot water to the warming plates 6 and for the removal of condensate or water from the warming plates to header 28. Control valve 18 is operated by recorder-controller 24 through reset controller 29 and cycle timer 25. Its function is to admit low pressure steam or hot water into warming plates 6 through a pipe manifold connected to all plates, to raise the temperature of the frozen rice to all successively selected temperature settings between a range of 28° F. and 120° F., as controlled by recorder-controller 24, reset controller 29 and cycle timer 25 to effect sublimation of ice crystals and any remaining refrigerant snow and/or evaporation of slowly released moisture under high vacua within the approximate temperature range above noted. Temperatures lower than 28° F., such as will exist at the beginning of the cycle, will effect sublimation under high vacua when the vessel is connected to the vacuum apparatus through valve 8 and vacuum header 9, but the rate of moisture removal is much slower than at 28–32° F. For that reason, higher sublimation and evaporation temperatures are used in the initial moisture removal operation. The same recorder-controller 24, cycle timer 25 and reset controller 29 can be adapted to not only operate the control valves as above described, but can automatically reset the control temperatures at timed intervals to stepwise increase the temperature control points as moisture removal proceeds. Thus, after sufficient time has elapsed to have effected removal of approximately one-half of the moisture, control valve 18 is more fully opened to allow increased flow of the warming medium, while simultaneously shutting off injector steam to the final stage of three stage vacuum apparatus 26 to reduce the vacuum within the freezer-sublimator to approximately 27" Hg which corresponds to a temperature of 114° F. This produces rapid drying and simultaneous removal of any desired part of the moisture remaining in the rice product without materially affecting its porosity which freezing has provided.

After the product has been dehydrated under sublimation and vacuum evaporation conditions to a moisture content of approximately 25 percent, wet basis, it is sufficiently dry and free flowing to allow subsequent handling in a continuous drying operation. Lower hinged head 5a is then opened, preferably by means of a hydraulic cylinder, which is also controlled from cycle timer 25. The partially dried rice falls to conveyor 30 and passes through tunnel dryer 31 where it is dried to the desired moisture content. If no further processing is contemplated, the final moisture content will range from 4 to 14 percent. If the rice will be subjected to the expansion drying process disclosed in my co-pending application, Serial No. 9,574, filed February 18, 1960, its moisture content should be within the range of 10 to 20 percent for best results. The final moisture content will range between 4 and 10 percent after this additional processing operation.

Tunnel dryer 31 consists of conveyor 30, a suitable housing, air heater 32, steam control valve assembly 33 which is actuated from temperature controller 34 by temperature sensing element 35 which may be located either in the warm air current over and through the product, or in discharge hopper 36. Dryer fan 37 moves the air through the air heater 32, over and through the product on conveyor 30 and discharges the partially saturated air from the dryer housing.

The freezer-sublimator vessels are arranged in groups of four, or multiples of four for most efficient production cycle control. Vessel 4b is simultaneously receiving steam or hot water as a warming medium through control valve 18 and is discharging it through valve 27 or 27a. Vessel 4c has ben through its refrigeration and thawing operations and is discharging to conveyor 30 through its bottom gate 5a preparatory to resuming its cycle of operations.

Spent refrigerant is returned to the refrigerant recovery and recompression system by means of spent refrigerant header 20. This system comprises a pipe header 20b, which receives spent refrigerant gas from header 20, and from gas chiller 38, and either delivers all or part of it through process water cooler 39 to spent refrigerant gas holder 40, or delivers to the latter directly through by-pass relief valve 42 should temperature control valve 41 restrict the flow of spent gas to the shell of water cooler 39. From gas holder 40, the spent refrigerant gas is delivered to multistage compressor 43, which may be equipped with moisture removal devices between the second and any succeeding stages, where the refrigerant is compressed and delivered to after-cooler 44, which is equipped with centrifugal separator 45 where condensed moisture is removed before the compressed gas goes to gas dryer 46 where its remaining moisture is removed by adsorbents. The dehydrated, compressed gas is then chilled in gas chiller 38 to the liquid state or substantially thereto so that it may blend with the liquid refrigerant surge supply in holder 12 and resume its cycle through liquid refrigerant header 10 to the freezer-sublimators 4, 4a, 4b and 4c.

Liquid refrigerant holder 20 is refrigerated by a small auxiliary refrigeration system to maintain its temperature at approximately 0° F. to prevent pressure build up. While the schematic in FIG. 1 indicates that liquid refrigerant is supplied by tank truck, the refrigerant supply could be produced at the plant site by a suitable liquefied gas manufacturing unit. For instance, carbon dioxide may be recovered from stack gases from the boiler plant.

While in the foregoing description certain apparatus, piping, valving and control arrangements have been disclosed and illustrated in FIGS. 1, 2 and 3, functional equivalents as to equipment, ararngements and procedures within the scope of the appended claims, are within the scope of applicant's invention. The claims which follow are related to the process steps and sequences, and no claim is here made either to the product or the equipment, per se, except in their interrelations and functions in the process of manufacture.

Whereas there is described an instrumentation scheme for handling valve opening and closing operations because of the obvious labor savings and ease of controlling the process in an industrial plant employing this process, it is understood that equivalent manual operations may be substituted.

Reference has been made in the specification and in the appended claims to raw milled rice. This term is also inclusive of brown or milled and polished rice, which has been milled from parboiled rough or "paddy" rice.

In the specification, references are made to temperatures within the range of minus 30° F. to plus 30° F. during the freezing operation, whereas previously in the specification, a temperature of from plus 20° F. to minus 30° F., or lower is specified for the quick freezing step. The temperature ranges are not conflicting or contradictory for the reason that although the quick freezing step, per se, must carry the temperatures lower than plus 30° F., or only 2° F. below the freezing point of water, which is also approximately the upper temperature limit (26°– 28° F.) where the starch gel will freeze; it is also true that in raising the temperature of the quick frozen rice to the maximum temperature where sublimation of ice can occur without formation of liquid phase, the starch gel in the frozen rice is still frozen and the ice crystals therein are still expanding in their solid phase state to augment the pore-forming action which characterizes applicant's process. Thus, in being yet frozen at 30° F. and in reaching a maximum rate of sublimation within a temperature range of 28° F. to 32° F., the rice is still being subjected to a freezing action together with a sublimation action which are jointly contributing to pore formation as the ice expands and enters the vapor phase. All subsequent steps in this process relating to moisture removal are designed to remove ice crystals and any incipient liquid phase that may be formed under conditions which prevent or substantially limit absorption of liquid phase moisture by the porous, hydrophilic structures then existing in the freeze processed rice.

It should also be understood that the lower temperature range specified in the quick freezing operation, while sufficient to produce the desired product, may be carried even lower without departing from the spirit and intent of applicant's invention. Furthermore, that there can be a reasonable degree of overlapping of temperatures in low vacuum or atmospheric pressure drying once the product is partially dried to the extent that more conventional drying operations, such as are herein disclosed for the final stage drying, are practicable.

It should be observed that sublimation does not occur under static conditions. To the contrary, it can only occur under dynamic conditions, such as removal of ice vapor under the driving effect of high vacuum, or under the driving effect of cold air of low humidity. Sublimation involves removal of ice vapor while evaporation involves removal of water vapor.

The freezing point of gelatinized rice is between 26° F. and 28° F. and at that temperature the gel-bound water and the interstitial water between the rice grains are frozen as ice. However, at that temperature the heat transfer is slow; accordingly to speed freezing process the temperature is carried below the freezing point of the gel (viz., +20° F. to −30° F.) so as to promote faster and more complete freezing throughout the gelatinized rice grains.

Generally stated, in accordance with this invention gelatinized rice is subjected to a freezing operation by direct contact therewith of a non-toxic refrigerant and at a temperature sufficiently low and for a period sufficient so as to freeze the interstitial water and the gel-bound water as ice, and the frozen gelatinized rice is subjected to a sublimation operation under dynamic conditions, viz., under a vacuum or while subjected to the action of cold air of low absolute humidity, and within a temperature range including the temperature of the frozen gelatinized rice up to 32° F. and for a period sufficient so as to substantially remove the refrigerant and so as to remove a substantial part, viz., one-third to one-half of the ice as ice vapor, and so as to produce voids or pores in the rice product.

It is not economical to remove all of the bound water by sublimation, for that not only takes time but is expensive. After partial removal of the interstitial water and the gel-bound water by sublimation, the resulting rice product is sufficiently dry and free flowing to permit its handling by a drying operation. Accordingly the sublimation operation is followed by subjecting the frozen gelatinized rice to a drying operation at a temperature above 32° F. and for a period sufficient to remove an additional substantial part of the water by evaporation.

The process embodying this invention is to be distinguished from the freezing of biologicals, plasmas, fruit juices and such products as shrimp, oysters, meat and vegetables. In all of the latter the object is to preserve the product in a frozen state until ready for use. The rice product produced in accordance with this invention is capable of and is produced as a final product in the final dehydrated dry state whereby it can be stored for use at room temperature; that is not possible with the frozen products noted above. Furthermore, rice has a distinctive structure, having no completely starchy endosperm, but instead has an interwoven network of glutines and proteins surrounding the starch cells. The initial products are not only entirely dissimilar, but so are the processes, and so are the final products.

Having thus described the invention, what is claimed and desired to be secured by Letters Patent is:

1. The process of preparing a dehydrated porous rice product, comprising, subjecting discrete gelatinized rice grains to a freezing operation by direct contact therewith of a suitable non-toxic refrigerant and at a temperature sufficiently low and for a period sufficient so as to freeze the interstitial water and the gel-bound water in the grains as ice, and subjecting the frozen gelatinized rice grains to a sublimation operation under dynamic conditions and within a temperature range including the temperature of the frozen gelatinized rice grains and up to 32° F. and for a period sufficient so as to substantially remove the refrigerant and so as to remove a substantial part of the interstitial and gel-bound ice as ice vapor and so as to produce flowing rice grains and voids or pores in the rice grains but to preserve their porous structure.

2. The process of preparing a dehydrated porous rice product, comprising, subjecting discrete gelatinized rice grains to a freezing operation by direct contact therewith of a suitable non-toxic refrigerant and at a temperature sufficiently low and for a period sufficient so as to freeze the interstitial water and the gel-bound water in the grains as ice, subjecting the frozen gelatinized rice grains to a sublimation operation under dynamic conditions and within a temperature range including the temperature of the frozen gelatinized rice grains and up to 32° F. and for a period sufficient so as to substantially remove the refrigerant and so as to remove a substantial part of the interstitial and gel-bound ice as ice vapor and so as to produce flowing rice grains and voids and pores in the rice grains but to preserve their porous structure, and thereafter subjecting the resultant rice grains to a drying operation at a temperature above 32° F. and for a period sufficient so as to remove an additional substantial part of the water by evaporation in order to enhance the voids or pores in the rice grains.

3. The process of preparing a dehydrated porous rice product, comprising, subjecting discrete gelatinized rice grains to a freezing operation by direct contact therewith of a suitable non-toxic refrigerant and at a temperature sufficiently low and for a period sufficient so as to freeze the interstitial water and the gel-bound water in the grains as ice, and subjecting the frozen gelatinized rice grains to a sublimation operation under a high vacuum and within a temperature range including the temperature of the frozen gelatinized rice grains and up to 32° F. and for a period sufficient so as to substantially remove the refrigerant and so as to remove a substantial part of the interstitial and gel-bound ice as ice vapor and so as to produce flowing rice grains and voids or pores in the rice grains but to preserve their porous structure.

4. The process of preparing a dehydrated porous rice product, comprising, subjecting discrete gelatinized rice grains to a freezing operation by direct contact therewith of a suitable non-toxic refrigerant and at a temperature sufficiently low and for a period sufficient so as to freeze the interstitial water and the gel-bound water in the grains as ice, subjecting the frozen gelatinized rice to a sublimation operation under a high vacuum and within a temperature including the temperature of the frozen gelatinized rice grains and up to 32° F. and for a period sufficient so as to substantially remove the refrigerant and so as to remove a substantial part of the interstitial and gel-bound ice as ice vapor and so as to produce flowing rice grains and voids or pores in the rice grains but to preserve their porous structure, and thereafter subjecting the resultant rice grains to a drying operation under a lower vacuum and at a temperature above 32° F. and for a period sufficient so as to remove an additional substantial part of the water by evaporation in order to enhance the voids or pores in the rice grains.

5. The process of preparing a dehydrated porous rice product, comprising, subjecting discrete gelatinized rice grains to a freezing operation by direct contact therewith of a suitable non-toxic refrigerant and at a temperature sufficiently low and for a period sufficient so as to freeze the interstitial water and the gel-bound water in the rice grains as ice, and subjecting the frozen gelatinized rice grains to a sublimation operation while subjected to the action of a cold gas of low humidity and within a temperature range including the temperature of the frozen gelatinized rice grains and up to 32° F. and for a period sufficient so as to substantially remove the refrigerant and so as to remove a substantial part of the interstitial and gel-bound ice as ice vapor and so as to produce flowing rice grains and voids or pores in the rice grains but to preserve their porous structure.

6. The process of preparing a dehydrated porous rice product, comprising, subjecting discrete gelatinized rice grains to a freezing operation by direct contact therewith of a suitable non-toxic refrigerant and at a tempreature sufficiently low and for a period sufficient so as to freeze the interstitial water and the gel-bound water in the rice grains as ice, subject the frozen gelatinized rice grains to a sublimation operation while subjected to the action of a cold gas of low humidity and within a temperature range including the temperature of the frozen gelatinized rice and up to 32° F. and for a period sufficient so as to substantially remove the refrigerant and so as to remove a substantial part of the interstitial and gel-bound ice as ice vapor and so as to produce flowing rice grains and voids or pores in the rice grains but to preserve their porous structure, and thereafter subjecting the resultant rice grains to a drying operation at a temperature above 32° F. and for a period sufficient so as to remove an additional substantial part of the water by evaporation in order to enhance the voids or pores in the rice grains.

References Cited in the file of this patent

UNITED STATES PATENTS

| | | |
|---|---|---|
| 2,059,970 | Robillard | Nov. 3, 1936 |
| 2,785,070 | Kester et al. | Mar. 12, 1957 |
| 2,808,333 | Mickus et al. | Oct. 1, 1957 |
| 2,926,501 | Morrison | Mar. 1, 1960 |

OTHER REFERENCES

"Food Industries," January 1945, pages 92 to 95, 168, 170, 172, 174, 176 and 178, article entitled "Drying by Sublimation."

"Food Technology," 1958, vol. XII, No. 9, pages 464 to 468, article entitled "The Effect of Freezing on the Hydration Characteristics of Rice."

UNITED STATES PATENT OFFICE
CERTIFICATE OF CORRECTION

Patent No. 3,113,032                                                  December 3, 1963

Truman B. Wayne

It is hereby certified that error appears in the above numbered patent requiring correction and that the said Letters Patent should read as corrected below.

Column 2, line 15, for "is" read -- are --; line 49, after "flowing," insert -- and reduces --; column 3, line 40, for "presures" read -- pressures --; column 7, line 4, for "refregirenat" read -- refrigerant --; column 12, line 26, for "glutines" read -- glutelins --; same column 12, lines 45 and 60, column 13, lines 4 and 19, and column 14, lines 1 and 17, after "produce", each occurrence, insert -- free --.

Signed and sealed this 21st day of July 1964.

(SEAL)

Attest:

ESTON G. JOHNSON                                           EDWARD J. BRENNER
Attesting Officer                                                Commissioner of Patents